US008798598B2

(12) United States Patent  (10) Patent No.: US 8,798,598 B2
Rossmann  (45) Date of Patent: Aug. 5, 2014

(54) METHOD AND SYSTEM FOR SCREENCASTING SMARTPHONE VIDEO GAME SOFTWARE TO ONLINE SOCIAL NETWORKS

(76) Inventor: Alain Rossmann, Palo Alto, CA (US)

( * ) Notice: Subject to any disclaimer, the term of this patent is extended or adjusted under 35 U.S.C. 154(b) by 16 days.

(21) Appl. No.: 13/614,987

(22) Filed: Sep. 13, 2012

(65) Prior Publication Data
US 2014/0073298 A1 Mar. 13, 2014

(51) Int. Cl.
H04M 3/42 (2006.01)
(52) U.S. Cl.
USPC ........................................ 455/414.2
(58) Field of Classification Search
USPC ............... 455/566, 456.1, 557; 348/239, 148, 348/208.12, 46, 333.11; 382/195, 100
See application file for complete search history.

(56) References Cited

U.S. PATENT DOCUMENTS

| | | |
|---|---|---|
| 7,184,918 B2 | 2/2007 | Hamilton et al. |
| 2010/0208070 A2* | 8/2010 | Haynes et al. ................. 348/148 |
| 2013/0215292 A1* | 8/2013 | Reichelt ........................ 348/239 |

* cited by examiner

Primary Examiner — Kiet Doan
(74) Attorney, Agent, or Firm — Stephen E. Zweig

(57) ABSTRACT

A software implemented method and system for screencasting display screen video and sound from third party applications, such as video game software, running on Smartphones, annotating the captured video, compressing it, and uploading it to various online social networks. The method provides a providing a display screen capture and recording application capable of recording Smartphone display screen video output at a rate of at least 10 frames per second, along with recording game sounds and game player audio commentary. The method further compresses the recordings and uploads them to various online social network internet servers, either directly or via a video distribution server. The method further provides a simple user interface to facilitate this process.

25 Claims, 4 Drawing Sheets

Figure 2
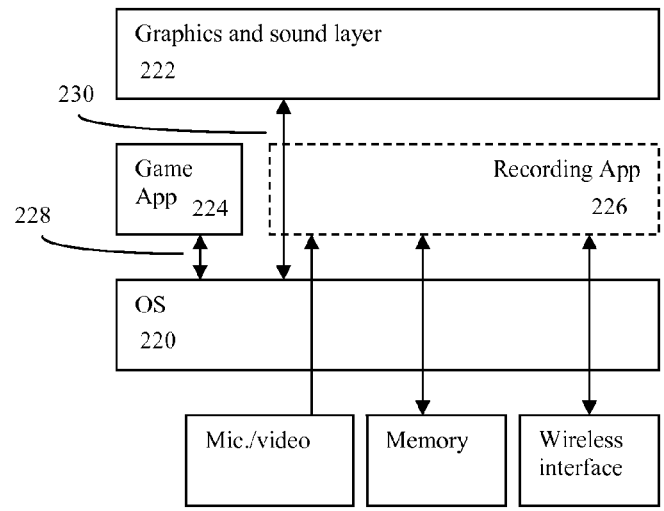
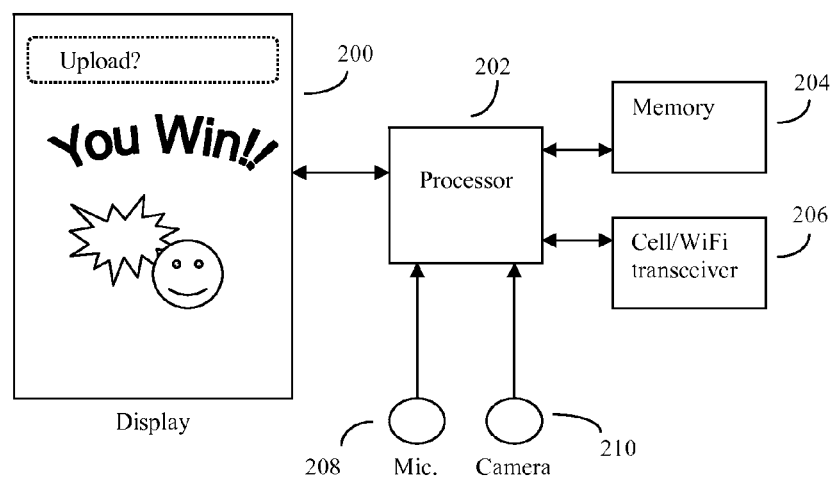

METHOD AND SYSTEM FOR SCREENCASTING SMARTPHONE VIDEO GAME SOFTWARE TO ONLINE SOCIAL NETWORKS

BACKGROUND OF THE INVENTION

1. Field of the Invention

This invention is in the field of software implemented screencasting applications for handheld computerized devices such as Smartphones, as well as in the fields of video gaming technology and online social network technology.

2. Description of the Related Art

In recent years, handheld computerized devices such as Smartphones, tablet computers and the like, exemplified by the Apple iOS and Android series of Smartphones and tablet computers, have become nearly ubiquitous. These devices are often highly capable. They are usually equipped with at least one high performance microprocessor or microprocessor core (often with an onboard graphics coprocessor), gigabytes of memory, and high-resolution, touch-sensitive display screens. One of the reasons why the devices are so popular is that they allow their users to upload and run various third party applications, such as utility software, applications software, and various types of video games.

As a result, Smartphone/mobile phone based video games have become extremely popular, and indeed represent the fastest growing segment of the video games industry. Smartphone based video games are, on a unit sales basis, now in the process of overtaking all other forms of games, from console based video games, to PC video games, and even dedicated portable hardware video games.

In this discussion unless otherwise specified, Smartphone devices and tablet devices will often be referred to generically as "Smartphones". From a definitional standpoint, a Smartphone should be considered to be a pocket sized tablet computer with wireless cell phone transceiver capability. A tablet computer should usually be considered to be a larger sized (e.g. 7", 10" screen) device with at least wireless WiFi connectivity, but not necessarily a cellular phone transceiver. Smaller screen devices in this family with WiFi transceivers but without cell phone transceivers, exemplified by the Apple iPod touch family of products, are also covered by the invention under the overall "Smartphone" designation although these can be considered to be a species of smaller screen tablet devices.

Gaming is often a social experience, and video gamers enjoy sharing their gaming experience with others. One of the most common ways that video game players do this is by recording a movie or a partial movie of their game session, usually thorough video screen capture software, and then by sharing this movie with others.

In addition to gaming, users of other types of applications software may also wish to share their experience with others as well. Although this specification will generally refer to the use of gaming software and shared gaming experiences, unless otherwise specified, the concepts herein will more generally refer to sharing the display screen output from a variety of different Smartphone applications.

The process of recording computer screen output is often called "screencasting". There are a number of hardware and software methods to implement screencasting, exemplified by Adobe Captivate, Adobe Systems, Inc; Camtasia Studio, TechSmith Corporation, and the like. Prior art in this area includes Hamilton et. al., "Automated system and method for conducting usability testing", U.S. Pat. No. 7,184,918. There are also a number of different hardware based screen capture systems as well.

Hamilton taught a method for conducting usability tests, and the Hamilton patent, originally filed in 2005 before the advent of modern Smartphones and tablet computers, taught techniques more appropriate for traditional personal computer devices with large display screens. Hamilton's methods, oriented towards computer instruction technology, teach a technique wherein the user would set a plurality of different recording settings, and use a rather complex software program to record instructional videos and the like. Hamilton's methods were adapted to traditional personal computers and operating systems that generally posed few barriers to allowing third party software to get root access to the computer, and thus acquire privileged control over the host computer system.

By contrast, the operating systems for Smartphones and other mobile handheld computerized devices, such as tablet computers, are often designed to deny root access to users and user applications.

The Apple iOS operating system, in particular, is notorious for very securely locking down the device and denying users root access. By contrast, the Android operating system is somewhat more permissive, and depending on the software version, may permit or deny users root access with various degrees of stringency.

For essentially all models of Smartphone, technically savvy users often find ways to work around operating restrictions to gain root access, even when the operating system was originally designed to prevent such access. This process is often referred to as jail-breaking or rooting. Such jail-breaking or rooting processes are strongly and actively disfavored by manufacturers however, and thus are outside of the realm of standard practice for the majority of Smartphone users. Additionally, manufacturers frequently release operating system updates that "break" or overcome previous jail-breaking methods, making jail-breaking methods of acquiring root access more of a demanding skill for technical enthusiasts rather than a routine general purpose software methodology. This situation is unfortunate, since access to computationally intensive audio and visual processing techniques can be greatly facilitated when root access is available.

At present, although there are over 500,000 mobile apps (Smartphone apps) presently published, there are only a handful of video capture apps that are presently available for mobile phones. These include the "Z-Screen Recorder" by ZAUSAN Innovación Tecnológica, and "Screencast Video Recorder", both of which run on the Android operating system and require root access to perform their task.

Another approach is exemplified by "Kamcord", which is an iOS software package provided in source code and library format to developers to enable them to implement a screencast feature by integrating and delivering this software package with their application (e.g. a game application can incorporate Kamcord routines and thus make screencasting capability an integral part of the game itself).

By having the application itself do the recording, Kamcord bypasses the issues inherent in having a separate screencast application and the need for that application to take control of the information in the mobile device screen buffer to perform its task, such control requiring in most operating system root access. The application can render the display in a temporary buffer separate from the protected screen buffer and this buffer can be used for recording purpose. Modern mobile devices have hardware that is fast enough for the impact of this extra step to be minimal from the user perspective.

BRIEF SUMMARY OF THE INVENTION

The invention is based, in part, on the insight that there is presently an unmet need by Smartphone video game players (as well as other Smartphone third party app users), for a simple, easy to use program that can capture a video game session (or other third party app session) even if the game or third party app was not specifically designed to offer screencasting. This invention will optionally also record the Smartphone user's audio and video commentary (e.g. commentary on the progress of the video game) that may, for example, be captured from the mobile device's mic. (or other sound input source). The invention may then, in some embodiments, mix this input sound to the audio generated by the third party app game (e.g. mix the user's game commentary with the game's own sounds).

There is also an unmet need for a unified application that can then, after the screencast recording process, also help the Smartphone user upload the captured video content (e.g. captured video game video) to one or more online social networks so that the game player's friends or other individuals can share the users' experience.

The invention is also based, in part, on the insight that due to the unique needs of Smartphone users, a program that would meet these unique needs would, in turn, have certain unique aspects. For example, due to the generally smaller size of the Smartphone's display screen or video screen, and the Smartphone user's typical interest in simple operating methods, Smartphone users will need a method to start and stop recording while the applications they wish to record are running and controlling the mobile device's input and display. Because the recorded application was not specifically designed to allow screencasting, there is a need for a convenient method to control the screencasting operation.

Additionally, because Smartphone operating systems are generally more "locked down" than is the case for prior art personal computer operating systems, Smartphone screencast and social network uploading solutions may, at least in some embodiments, need to function in a more locked down operating system environment (relative to prior art PC methods), where root access may be denied.

Further, to be consistent with the Smartphone user's desire for simplicity, any solution to these unmet needs should also make it easy for the Smartphone user to then subsequently upload the recorded screencast session (e.g. recorded game) to one or more online social networks. This requires that the invention's screencast methods (e.g. display screen capture and recording application) function in an environment where the third party software (e.g. the at least one software program not natively configured to allow its display screen video output to be captured and recorded by the device) will often have control over the device's display screen and input buttons. This also requires that the user spend little or no time configuring the display screen capture and recording application (screencast method). The invention further provides simplified user interfaces and functionality that can operate under such an environment.

BRIEF DESCRIPTION OF THE DRAWINGS

FIG. 2 shows how the invention's software can interact with a Smartphone operating system, a third party application such as a game program, and with the various hardware components of a Smartphone or similar type computerized device.

DETAILED DESCRIPTION OF THE INVENTION

Figure 1:
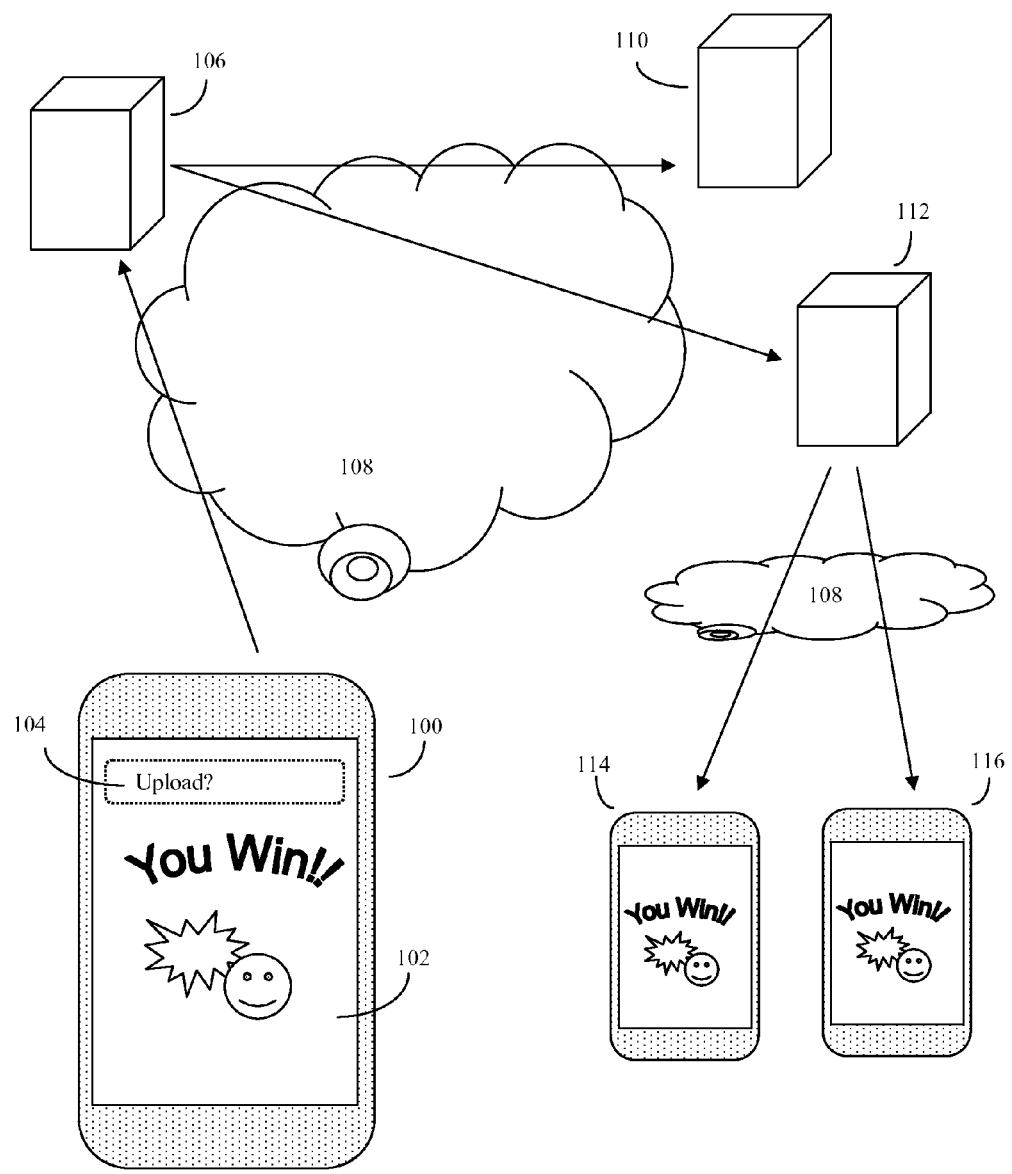
FIG. 1 shows an overview of the invention in operation, showing how the invention's screencast software methods can both capture game video and associated commentary, as well as upload this captured video media to a remote video distribution server. This remote video distribution server can then in turn distribute (either by providing the actual data or a URL link to the data) the uploaded screencast media to one or more online social network servers. Alternatively, the invention can upload the screencast video directly to one or more social network servers.

In general, the invention creates an easy to use solution for mobile application recording and sharing. The system can capture (e.g. create screencasts of) the live video content of the mobile display, as well as the accompanying game sounds. The system can optionally further mix these sounds with input from the Smartphone's microphone (or other audio input). The system can also optionally mix in input from the device's video camera as well, so as to optionally simultaneously capture real-world videos of the user's face or hand gestures for example. The invention's software implemented methods can also save this captured video and soundtrack as a either a single compressed video file, or as multiple files, and allow the user to post these files to a video-capable network server for subsequent sharing with other users.

More specifically, in some embodiments, the invention may be a software implemented method of capturing and recording (e.g. screencasting) the display screen video output of at least one software program running on a handheld mobile computerized device, such as a Smartphone. This mobile computerized device will generally comprise at least one processor, video display screen, memory, sound input device, operating system, and at least one wireless transceiver, such as a cellular phone transceiver, a WiFi transceiver, a Bluetooth® transceiver, and the like.

As previously discussed, this "at least one software program" will typically be a third party application, such as a video game program or other type program. Usually this program will not itself be natively configured to allow the display screen video output to be captured and recorded by the computerized device. This is because it is cumbersome for each application to implement such functionality.

In its simplest form, the invention's software implemented methods will generally comprise providing (often by uploading to the computerized device) the invention's display screen capture and recording application (screencast application), and then activating this recording application. Because games (or other Smartphone applications) typically take up most or all of the limited screen area of Smartphone display screens, in a preferred embodiment, the invention's recording application will usually be configured to capture the entire Smartphone video display screen. In order to convey good motion information, in a preferred embodiment, the invention's recording application will generally be configured to capture and record the display screen video output at a rate of at least 10 frames per second, and preferably over 16 frames per second as higher frame rates produce more fluid and natural looking video. The system will also generally record the game's software generated audio as well, which will be discussed in more detail shortly.

As previously discussed, the invention's screencast recording application will also generally be configured to capture and record external sound input data (e.g. the Smartphone user's spoken comments). These recorded audio external sounds will usually be obtained from the mobile computerized device's sound input device (e.g. microphone, microphone jack, and the like). In some embodiments, this sound information may be time synchronized with the captured screencast video in a manner either may allow this recorded sound input data to be time synchronized with the recorded display screen video output. Alternatively, this external audio may be stored in a separate file and need not be time synchronized with the captured screencast video and audio data.

Although often the Smartphone device's built in sound input device (e.g. microphone) may be used for this purpose, other configurations are also possible. Alternatively the recording application may take the sound input data from a microphone input jack for an external microphone, or even take the external audio data from a built in wireless receiver or transceiver, such as a Bluetooth® receiver. In this later configuration, the invention's recording application could take its external sound input data from a wireless headset such as a Bluetooth headset.

In some embodiments, the screencast recording application will automatically adjust (e.g. reduce) the sound input from the game while the user is speaking. This sort of automatic sound reduction is frequently referred to in the audio industry as "ducking". Using this terminology, the sound channel that is reduced in volume is referred to as the "ducked" track, while the sound channel that is made to dominate is referred to as the "ducking" track. Although the invention's recording software can, in principle, be made to favor either the sound from the software application (e.g. game sound) or the sound from the user (e.g. microphone sound), often in practice game players and other Smartphone users will prefer that their voice comments dominate over the game sound track while they are speaking. Thus usually the external audio will constitute the ducking track, while the game or other application software's internally generated audio will constitute the "ducked" track.

The invention's screencast recording application can be activated by various ways. Often mobile computerized devices have a number of different physical input buttons (e.g. volume buttons, hold buttons, ringer buttons, home buttons, and the like), a touch sensitive display screen or both. Thus the invention's screencast recording application may be configured to monitor the status of at least two of the various physical input buttons, and/or display a control icon on the touch sensitive display screen, and detect user touch input on this control icon. In either mode, the recording application can be activated when it detects either user touch input on the control icon, and/or user pressing of at least two of the physical input buttons.

Thus, for example, the user could activate the screencast recording program by pressing two hardware buttons, such as a hardware power button and a hardware volume increase button at the same time. This particular combination is useful because in some Smartphones, pressing the hardware power button and the hardware power decrease button simultaneously will cause the device to take a screenshot of the device screen, using software that is generally included as an inherent part of the device operating system. This way the screencast start operation and the screenshot operation can be both in the same family of commands, yet distinguished from each other.

As previously discussed, popular Smartphone operating systems, such as iOS, often do not normally permit third party applications to gain root access privileges. Additionally, some operating systems also have lockouts to; for example, prevent third party applications from recording Smartphone telephone conversations. To overcome this security feature, the invention's screencast recording software may, in some embodiments, be configured to operate without requiring operating system root access privileges. Here, for example, the inventions' screencast software may operate by various methods.

In some embodiments, the invention's screencast software may activate the operating systems' built in, still-image, screen capture software at a high rate (e.g. a video capture rate of 10 frames per second or greater), as well as sample the microphone or other external sound input at a (possibly intermittent) sufficient rate to enable the screencast software to also capture external sounds as well.

In other embodiments, such work around methods may not be needed, and instead the invention's application's software may periodically poll the video output at other software stages, such as by intercepting and reading, commands from the game software to the operating system screen renderer, and/or interrogating the state of the display screen video buffer.

Given the high resolution of modern Smartphone video display screens (as an example, the Apple iPhone 4 Retina® display screen has a 960 by 640 resolution with 24 bit color depth and 8 bits of transparency e.g. 32 bit effective color and transparency per pixel), capturing video at a speed of 10 frames per second or greater, if not compressed, will rapidly consume large quantities of memory. Additionally, the high memory size footprint of the resulting video and sound file, if not compressed, will also make it more difficult to upload the saved video to various social networks.

To avoid this problem, in many embodiments of the invention, the screencast recording application will be further configured to compress the captured display screen video (and audio) output either during or after the capture. Here available system resources (e.g. processor speed relative to running the video game, the screencast software, and the video compression codec) should be considered. If in some Smartphone models, the screencast software determines that it is too processor intensive to compress video during the initial capture, then video can be stored directly to memory in an uncompressed or partially compressed form, and then further compressed after the initial screencast capture session.

In general, the invention's screencast recording application can be configured to automatically implement such compression, either by directing the captured video and audio to under-utilized hardware based processor compressors onboard the computerized device, or by implementing various software compression algorithms such as H.264 or Windows Media Video (WMV), or any other video compression algorithms.

Similarly, with regards to uploading the captured video to one or more internet servers, to be discussed in more detail shortly, the invention's recording software can either upload during the recording session, or after the recording session. Although the software may be designed to support either option, it is anticipated that commonly users may often prefer to review their recorded screencast material and decide to share it or not before uploading it for others to watch. Here again, when recorded material is uploaded by the user and computerized device to a remote server after a game recording session, the invention's screencast recording software may either compress and upload, or compress while uploading depending on available computational resources onboard the device.

Many popular mobile computerized devices (Smartphones) comprise two video cameras. These often consist of a lower resolution front-mounted video camera (intended to capture the user's face for various video chat applications), and a higher resolution rear-mounted video camera, used to capture higher resolution video and still images of the user's surroundings. Although either video camera may be utilized by the invention's screencast recording software methods, often it will be preferable to utilize the lower resolution front mounted camera to record the Smartphone user's face and hand gestures while the user generates comments regarding the game (or other application).

To do this, the invention's screencast recording application can be configured to capture and record video data from the device's front or back camera in a manner that further allows the recorded video data from the front or back camera to be saved to a file or in some embodiments combined into a single file, and then uploaded to the online social network as well. The invention's screencasting software may be optionally be configured to overlay a small inset of the captured video on the device's display while the game or other application is playing so that the user can get feedback as to his or her appearance on the video camera during the capture process.

As with the external audio data, in some embodiments this external video commentary may be time-synchronized with the screencast recorded display screen video output, and stored in the same file. In other embodiments this video commentary may be stored in a separate file, which may or may not be time synchronized with the screencast recorded display screen output.

In cases where the video game itself samples the device's video camera's output and echoes this on the device's display screen, then the invention's recording software need not be set up to further sample the device's video camera, although this of course may be done if desired by the user.

FIG. 1 shows an overview of the system, showing how the invention's software methods can capture game video and associated commentary, and upload this media to a remote video distribution server, which in turn can distribute the media to one or more social networks.

In this figure, mobile computerized device (100), such as a Smartphone, is shown running a particular type of software program, such as a game application on the device's display screen (102). The user has previously instructed the invention's recording application to screencast record the game (not shown). In this case, after the game has finished, the invention's screencast recording application will usually automatically compress the video, also prompt the user (104) to determine if the user wishes to upload this particular compressed game video to a remote video distribution internet server (106), often by a wireless (e.g. cellular wireless link, WiFi wireless link) through the internet (108). This remote video distribution internet server (106) in turn may be configured with remote video distribution internet server software to interface with one or more social network servers that also manage one or more online social networks (110), (112), and transmit either the compressed game video to them as well, or alternatively transmit a link, such as a URL link (e.g. the internet URL address where the compressed game video may be found) by which the compressed game video may then be subsequently viewed. As a result of this data exchange, various other members of the video gamers' social network (e.g. 114, 116) can in turn be streamed or uploaded to other viewers, thus enabling other's to share in the first user's video game experience.

FIG. 2 shows how the invention's software can interact with a handheld mobile computerized device (e.g. Smartphone) operating system, a game program, and with the various hardware components of a Smartphone or similar type computerized device.

On an abstract level, the handheld mobile computerized device may be viewed as comprising a case (not shown) containing a touch sensitive display screen (200), a processor with at least one processor core and often at least one graphics-coprocessor (202), memory (some RAM, and often many gigabytes of persistent storage memory such as FLASH memory (204)), at least one wireless transceiver (e.g. a cellular telephone transceiver, and/or a WiFi transceiver and optionally other transceivers such as a Bluetooth transceiver) (206), audio input such as a microphone or microphone jack (208) and often at least one video camera (210). Other inputs such as buttons, and other devices such as the power source, etc. are not shown.

In FIG. 2, the various types of software stored in memory (204) are also shown. Generally the mobile computerized device software may be viewed in a highly simplified form as consisting of the mostly non-graphical parts of the operating system (220) and the device's graphics and sound interface layer (222). The device's graphics and sound interface layer can consist of various graphics and sound software managers, renderers, memory buffers, and the like. This graphics and sound layer (222) then, for example, sends image data to the display screen (200.

Various applications, such as the software program (e.g. game program) (224) and the invention's recording application (226) may be viewed as running on top of the operating system (220). These applications in turn, usually though API provided by the operating system (220) send output data such as the video screen data and sound data via the operating system API to the graphics and sound layer (222). This graphics and sound layer (222) then, often with the aid of various drivers, in turn drive the device's display screen (200) and sound output.

Other mobile computerized device components, such as the device's microphone (208) and camera input (210, the device's memory (204) and the device's wireless interface (206) also interact with the device through the operating system software and various drivers as appropriate.

The invention's recording app may be viewed as operating in at least one of various possible modes. In some modes, the game application (or other third party application) (224) may communicate data ultimately intended for the graphics and sound layer (222) and the display screen (200) by communicating through various Applications Programming Interfaces (API) (228) provided by the operating system (220). The operating system (220) in turn may then transmit the data (230) to the graphics and sound layer (222). The invention's screencast recording application (226) may intercept this data, interrogate the state of the graphics and sound layer (222) directly, or use other methods as appropriate. The invention's screencast recording application may also interact with the device's microphone (208) and video camera (210), memory (204) and the device's wireless transceiver (206), usually through various operating system API as well.

Figure 3:
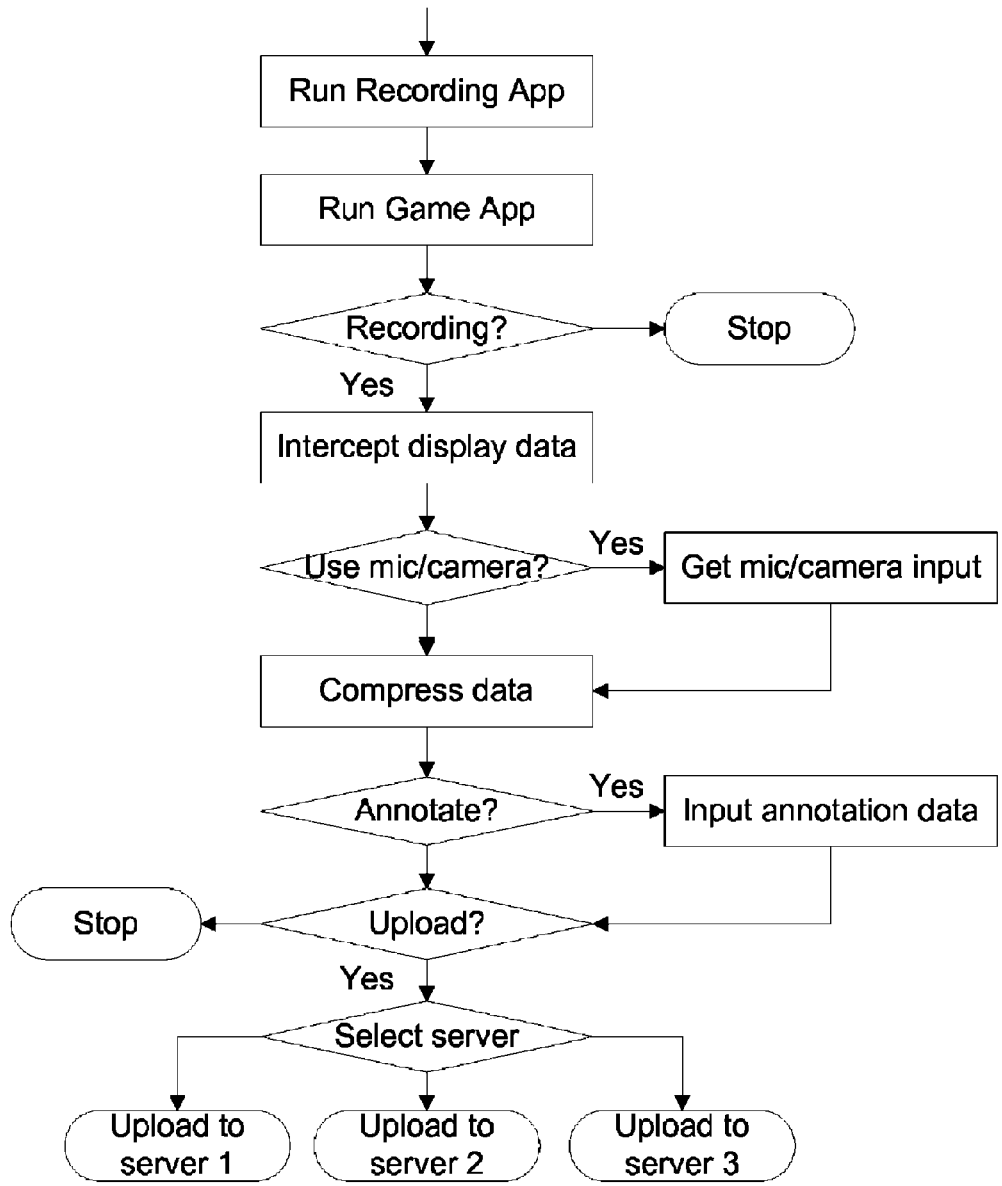
FIG. 3 shows a flow chart of the invention's software in operation.

FIG. 3 shows a flow chart of the invention's software in operation. In operation, generally the user will often first activate the invention's screencast recording app, which will then run in the background while the user then activates the game application (e.g. third party software program). The invention's screencast recording app will be activated when the user presses one or more activation buttons or icons, and if these are not activated will otherwise remain in a state of inactivity or low activity.

If the screencast recording start signals are detected, the invention's screencast recording application will then act to intercept data to the device's video display, and (as configured) will usually also record external audio data from the device's audio input (e.g. microphone) and possibly external video data from the device's video camera as well. The invention's screencast recording app will then compress the video and audio data as previously described. Either before, during, or after the game screencast recording session has executed, the invention's screencast recording software may prompt the user to determine if the user wishes to annotate the game video with additional written, audio, or video comments. The software will then usually help the user upload the recorded video to one or more internet servers (e.g. servers 106, 110, 112) as previously described.

The user (game player) annotation data can be of various types. Generally such annotation data will be described as video metadata. In addition to text annotation (e.g. adding additional gamer talk comments such as "Powned it!"), the user annotation data can be various types of metadata such as the Global Positioning System (GPS) location of the user, the user's name, identification, and the like. This annotation data can either be stored as part of the game video file, or as a separate annotation data file that can be co-uploaded along with the game video file.

Figure 4:
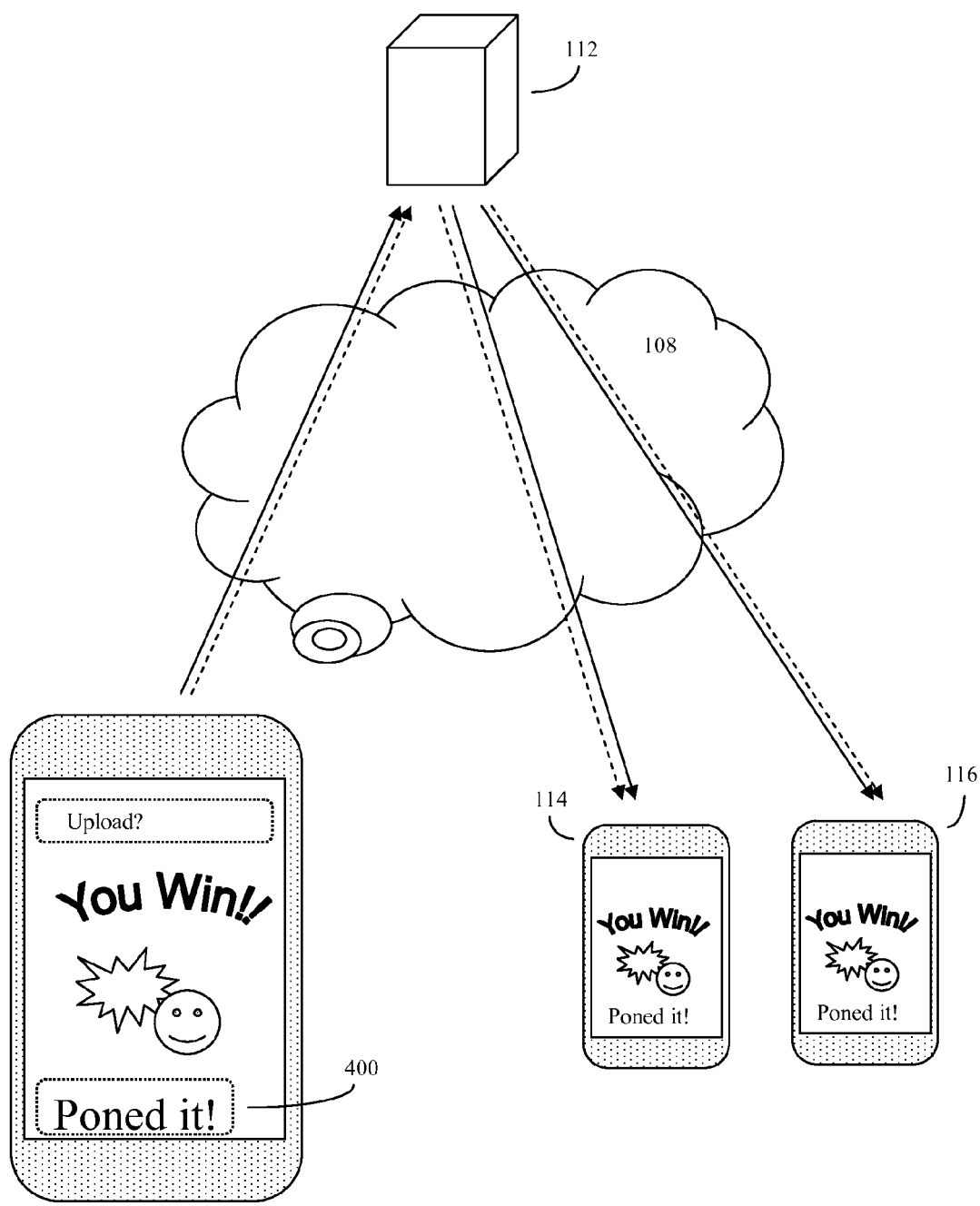
FIG. 4 shows a detail of a Smartphone user (here a game player user) annotating the captured screencast game video before uploading it directly to a remote social network server. The figure also shows various social network users then observing the previously uploaded game and user annotation on their respective devices or web browsers.

As previously discussed, the uploaded game video data can be either uploaded to a remote video distribution internet server (e.g. 106) that is itself configured to transmit this recorded display screen video output and recorded sound input data to at least one online social network servers (e.g. FIG. 1 server 110 or 112), or the invention's recording application can itself upload the video data directly to one or more social network servers (e.g. 110, 112, as shown in FIG. 4).

After the data is uploaded, various things can happen. The invention's screencast recording software can be configured to retain the uploaded data locally (e.g. in the Smartphone memory) for further review and future uploading, or alternatively delete the data on the local device, thus freeing up additional Smartphone memory (204) for other video files or other data. In either event, after uploading, a copy of the uploaded video file will usually end up being stored on one or more remote internet servers such as (106), (110), and (112).

FIG. 4 shows a detail of a game player user annotating captured game video with the text annotation "Powned it!" (400), before uploading the game video file to a remote server (here a social network server 112). As before various social network friends of the game player can download or stream the uploaded game and annotation on their devices or web browsers (114, 116).

OTHER EMBODIMENTS

Although, as previously discussed, in some embodiments the invention's screencast recording application software may be installed by the user as a third party application after the mobile computerized device has been obtained from the other manufacturer, this need not always be the case. In some embodiments the invention's screencast recording application may be integrated with the mobile device system software by the manufacturer or other operating system provider, and obtained in this form as essentially another authorized operating system module. This later embodiment has the additional advantage that it does not require the user to install the invention's recording software nor to obtain root permission.

Various methods may be used to control the invention's screencast recording software. In some embodiments, the user may invoke the recording application through a touch sensitive screen graphical user interface, as previously described. This can be done by, for example, tapping an on-screen user interface (UI) element or icon to start recording, or by a combination of key presses as previously described. Alternatively, however, the invention's recording application can be configured to start recording automatically whenever anther application (such as a game application) is launched. Other possibilities are that the recording application can be configured to start recording after a predetermined game event, or by a timer.

The invention's screencast recording application can also be configured with other preset or default values as well. In some embodiments or options, the device's microphone may be set to always turn on during a game recording session. In other embodiments or options, the invention's screencast recording application may be configured to turn on or off, and/or to change its level relative to the sound generated internally (e.g. by the game running) on the mobile device In some embodiments, the invention's screencast recording application can be configured to stop recording whenever the user taps an on-screen user interface element (e.g. touch sensitive display screen icon). In other embodiments or options, the screencast application can be configured to stop recording when it detects a certain combination of key presses. As yet another option, the screencast recording application can be configured stop recording automatically when the third party app (e.g. game application) being recorded is paused (e.g. put into the background), or the user quits. The screencast recorder can also stop recording after completion of a particular game set, or upon expiration of a timer.

Depending on how the screencast recording software is configured, and as previously discussed, after the recording session, the invention's screencast recording application can display a choice of social network (and the associated social network servers) to upload the captured screencast video, as well as providing the user with the ability to add metadata (e.g. annotate) the video file as well.

Here, for example, the invention's screencast recording application may be configured so that when the user taps an on-screen "post" button, the application will then upload the video and its metadata to various previously chosen social networks. As needed, the user may additionally be prompted to log into those social networks, thus allowing the screencast video upload to be properly assigned to that user's social network account.

As previously discussed, in some embodiments, the video/metadata may be uploaded to an intermediate video exchange server (106), and this intermediate video exchange server (106), may in turn, if given access to that user's various social network credentials, then further post the uploaded video/metadata or a link to this data to various given social networks (e.g. 110, 112). Thus for example, internet server (110) could be a server for a social network like Twitter, while server (112) could be a different server for a different social network such as Facebook. This scheme was previously shown in FIG. 1.

Alternatively, as previously described, the invention's recording application can simply upload the video data and metadata directly to one of the internet servers for a given social network, as was previously shown in FIG. 4. As yet another alternative, both types of options may be implemented.

The invention claimed is:

1. A software implemented method comprising:
    capturing and recording the display screen video output of at least one software program running on a handheld mobile computerized device;
    said mobile computerized device comprising at least one processor, video display screen, memory, display screen video buffer, operating system screen renderer, sound input device, operating system, and at least one wireless transceiver;
    wherein at least one software program is not natively configured to allow said display screen video output to be captured and recorded by said computerized device;
    said method further comprising:
    providing a display screen capture and recording application on said computerized device, said display screen capture and recording program configured to run on said computerized device and capture and record said display screen by either intercepting and reading commands to said operating system screen renderer and/or software interrogating the state of said display screen video buffer;
    activating said recording application;
    using said recording application to capture and record said display screen video output at a rate of at least 10 frames per second;
    wherein said recording application additionally captures and records sound input data from said sound input device in a manner that allows said recorded sound input data to be time synchronized with said recorded display screen video output.

2. The method of claim 1, wherein said mobile computerized device has a plurality of physical input buttons, and/or a touch sensitive display screen;
    Wherein said recording application is configured to either monitor the status of at least two said physical input buttons, and/or display a control icon on said touch sensitive display screen and detect user touch input on control icon;
    Wherein said recording application is activated when it detects either user touch input on said control icon, and/or user pressing of at least two said physical input buttons.

3. The method of claim 1, further recording sounds produced by said at least one software program, producing software program sound data that is time synchronized with said recorded display screen video output.

4. The method of claim 3, further using the sound input data from said sound input device to control the intensity of the recorded software program sound data; or using the software sound data to control the intensity of said sound input data from said sound input device.

5. The method of claim 1, wherein providing said display screen recording application is done by installing said display screen recording application separately from said operating system.

6. The method of claim 5, wherein said display screen recording application does not have root access privileges to said operating system.

7. The method of claim 1, wherein said display screen recording application is installed along with said operating system.

8. The method of claim 7, wherein said display screen recording application is part of a standard operating system camera application.

9. The method of claim 1, further using said recording application to compress said captured and recorded display screen video output either during capture and recording, or after capture and recording.

10. The method of claim 1, wherein said mobile computerized device further comprises a front or back camera, further using said display screen recording application to capture and record video data from said front or back camera in a manner that further allows said recorded video data from said front or back camera to be time synchronized with said recorded display screen video output.

11. The method of claim 10, further displaying an inset of the video captured from said front or back camera in said display screen while said display screen recording application is capturing and recording video data.

12. The method of claim 1, wherein said at least one software program is a video game program, and said computerized device is a Smartphone or tablet device comprising at least one of a WiFi transceiver or a cellular telephone transceiver.

13. The method of claim 1, wherein said sound input device is a microphone, an input jack for an external microphone, or a wireless receiver or transceiver for an external wireless microphone.

14. The method of claim 1, further using said recording application to upload said recorded display screen video output and said recorded sound input data to at least one remote internet server.

15. The method of claim 14, further using said recording application to annotate or associate said recorded display screen video output or recorded sound input data with additional metadata.

16. The method of claim 14, wherein said at least one remote internet server is further configured to transmit said recorded display screen video output and recorded sound input data to at least one online social network.

17. The method of claim 14, wherein after said uploading, said recorded display screen video output and said recorded sound input data no are longer stored on said computerized device, and instead are stored on said remote internet server.

18. A software implemented method comprising:
    capturing and recording the display screen video output of at least one software program running on a handheld mobile computerized device;
    said mobile computerized device comprising at least one processor, touch sensitive video display screen, memory, display screen video buffer, operating system screen renderer, sound input device, operating system, a plurality of physical input buttons, and at least one wireless transceiver;
    wherein said at least one software program is not natively configured to allow said display screen video output to be captured and recorded by said computerized device;
    wherein said at least one software program is a video game program, and said computerized device is a Smartphone or tablet device comprising at least one of a WiFi transceiver or a cellular telephone transceiver;
    said method further comprising:
    providing a display screen capture and recording application by installing said display screen recording application on said computerized device separately from said operating system;
    said display screen capture and recording application configured to run on said computerized device and capture and record said display screen by either intercepting and reading commands to said operating system screen renderer and/or software interrogating the state of said display screen video buffer;

wherein said recording application is configured to either monitor the status of at least two said physical input buttons, and/or display a control icon on said touch sensitive display screen and detect user touch input on control icon;

activating said recording application when said recording application detects either user touch input on said control icon, and/or user pressing of at least two said physical input buttons;

using said recording application to capture and record said display screen video output at a rate of at least 10 frames per second;

further using said recording application to compress said captured and recorded display screen video output either during capture and recording, or after capture and recording;

wherein said recording application additionally captures and records sound input data from said sound input device and said at least one software program in a manner that allows said recorded sound input data and said recording sounds produced by said at least one software program to be time synchronized with said recorded display screen video output;

wherein said sound input device is a microphone, an input jack for an external microphone, or a wireless receiver or transceiver for an external wireless microphone.

19. The method of claim 18, wherein said mobile computerized device further comprises a front or back camera:

using said display screen recording application to capture and record video data from said front or back camera in a manner that further allows said recorded video data from said front or back camera to be time synchronized with said recorded display screen video output;

further displaying an inset of the video captured from said front or back camera in said display screen while said display screen recording application is capturing and recording video data.

20. The method of claim 18, further using the sound input data from said sound input device to control the intensity of the recorded software program sound data; or using the software sound data to control the intensity of said sound input data from said sound input device.

21. The method of claim 18, further using said recording application to annotate said recorded display screen video output and recorded sound input data with additional metadata and upload said recorded display screen video output and said recorded sound input data to at least one remote internet server;

wherein said at least one remote internet server is further configured to interface and transfer at least said recorded display screen video output and recorded sound input data to at least one online social network.

22. The method of claim 18, wherein said display screen recording application is installed along with said operating system; or wherein providing said display screen recording application is done by installing said display screen recording application separately from said operating system and wherein the separately installed display screen capture and recording application does not have root access privileges to said operating system.

23. A software implemented method comprising:

capturing and recording the display screen video output of at least one software program running on a handheld mobile computerized device;

said mobile computerized device comprising at least one processor, touch sensitive video display screen, memory, display screen video buffer, operating system screen renderer, sound input device, operating system, a plurality of physical input buttons, and at least one wireless transceiver;

wherein said at least one software program is not natively configured to allow said display screen video output to be captured and recorded by said computerized device;

wherein said at least one software program is a video game program, and said computerized device is a Smartphone or tablet device comprising at least one of a WiFi transceiver or a cellular telephone transceiver;

said method further comprising:

providing a display screen capture and recording application by installing said display screen recording application on said computerized device separately from said operating system;

said display screen capture and recording application configured to run on said computerized device and capture and record said display screen by either intercepting and reading commands to said operating system screen renderer and/or software interrogating the state of said display screen video buffer;

wherein said display screen capture and recording application does not have root access privileges to said operating system;

wherein said recording application is configured to either monitor the status of at least two said physical input buttons, and/or display a control icon on said touch sensitive display screen and detect user touch input on control icon;

activating said recording application when said recording application detects either user touch input on said control icon, and/or user pressing of at least two said physical input buttons;

using said recording application to capture and record said display screen video output at a rate of at least 10 frames per second;

using said recording application to compress said captured and recorded display screen video output either during capture and recording, or after capture and recording;

wherein said recording application additionally captures and records sound input data from said sound input device and said at least one software program in a manner that allows said recorded sound input data and said recording sounds produced by said at least one software program to be time synchronized with said recorded display screen video output;

wherein said sound input device is a microphone, an input jack for an external microphone, or a wireless receiver or transceiver for an external wireless microphone;

using the sound input data from said sound input device to control the intensity of the recorded software program sound data; or using the software sound data to control the intensity of said sound input data from said sound input device;

using said recording application to annotate said recorded display screen video output and recorded sound input data with additional metadata and upload said recorded display screen video output and said recorded sound input data to at least one remote internet server;

wherein said at least one remote internet server is further configured to interface and transfer at least said recorded display screen video output and recorded sound input data to at least one online social network.

24. The method of claim 23, wherein said mobile computerized device further comprises a front or back camera:
using said display screen recording application to capture and record video data from said front or back camera in a manner that further allows said recorded video data from said front or back camera to be time synchronized with said recorded display screen video output;
further displaying an inset of the video captured from said front or back camera in said display screen while said display screen recording application is capturing and recording video data.

25. The method of claim 23, wherein said display screen recording application is installed along with said operating system; or
wherein providing said display screen recording application is done by installing said display screen recording application separately from said operating system.

* * * * *